(12) United States Patent
Kawana et al.

(10) Patent No.: US 10,019,058 B2
(45) Date of Patent: Jul. 10, 2018

(54) INFORMATION PROCESSING DEVICE AND INFORMATION PROCESSING METHOD

(71) Applicant: SONY CORPORATION, Tokyo (JP)

(72) Inventors: Koichi Kawana, Chiba (JP); Noboru Murabayashi, Saitama (JP)

(73) Assignee: SONY CORPORATION, Tokyo (JP)

(*) Notice: Subject to any disclaimer, the term of this patent is extended or adjusted under 35 U.S.C. 154(b) by 140 days.

(21) Appl. No.: 14/915,209

(22) PCT Filed: Aug. 21, 2014

(86) PCT No.: PCT/JP2014/004298
§ 371 (c)(1),
(2) Date: Feb. 26, 2016

(87) PCT Pub. No.: WO2015/029393
PCT Pub. Date: Mar. 5, 2015

(65) Prior Publication Data
US 2016/0209919 A1    Jul. 21, 2016

(30) Foreign Application Priority Data
Aug. 29, 2013    (JP) ................... 2013-177745

(51) Int. Cl.
G06K 9/00      (2006.01)
G06F 3/01      (2006.01)
G06F 3/0484    (2013.01)
G06F 17/30     (2006.01)
G06K 9/34      (2006.01)
(Continued)

(52) U.S. Cl.
CPC .......... *G06F 3/013* (2013.01); *G06F 3/04842* (2013.01); *G06F 17/30256* (2013.01); *G06F 17/30268* (2013.01); *G06F 17/30967* (2013.01); *G06K 9/00671* (2013.01); *G06K 9/34* (2013.01);
(Continued)

(58) Field of Classification Search
CPC .................. G06F 3/013; G06F 3/04842; G06F 17/30256; G06F 17/30268; G06F 17/30967; G06T 7/11; G06T 7/73; G06K 9/00671; G06K 9/34; H04N 5/765; H04N 5/91
See application file for complete search history.

(56) References Cited

U.S. PATENT DOCUMENTS 5,912,721 A * 6/1999 Yamaguchi ............ A61B 3/113
                                                      351/209
9,224,037 B2 * 12/2015 Anabuki ............ G06K 9/00362
(Continued)

FOREIGN PATENT DOCUMENTS

JP    HEI 09-114846 A    5/1997
JP    HEI 10-133810 A    5/1998
(Continued)

*Primary Examiner* — Shefali Goradia
(74) *Attorney, Agent, or Firm* — Chip Law Group

(57) ABSTRACT

An information processing apparatus includes: a gaze position detection section that detects a gaze position of a user with respect to a display screen; a position information acquisition section that acquires position information of the user; and a control section that judges, based on the detected gaze position, a scene and an object in the scene that the user focuses in a content displayed on the display screen, and generates search information from the judged object and the acquired position information.

12 Claims, 13 Drawing Sheets

(51) Int. Cl.
*H04N 5/765* (2006.01)
*H04N 5/91* (2006.01)
*G06T 7/73* (2017.01)
*G06T 7/11* (2017.01)

(52) U.S. Cl.
CPC .................. *G06T 7/11* (2017.01); *G06T 7/73* (2017.01); *H04N 5/765* (2013.01); *H04N 5/91* (2013.01)

(56) References Cited

U.S. PATENT DOCUMENTS

2013/0136304 A1* 5/2013 Anabuki ............ G06K 9/00362
382/103
2014/0168056 A1* 6/2014 Swaminathan .... G06K 9/00604
345/156

FOREIGN PATENT DOCUMENTS

| JP | 2001-216527 A | 8/2001 |
| JP | 2004-181233 A | 7/2004 |
| JP | 2014-181233 A | 7/2004 |
| JP | 2010-034687 A | 2/2010 |
| JP | 2011-239158 A | 11/2011 |
| JP | 2012-504830 T | 2/2012 |
| JP | 2012-186621 A | 9/2012 |
| JP | 2012-243043 A | 12/2012 |
| JP | 2013-114595 A | 6/2013 |

\* cited by examiner

INFORMATION PROCESSING DEVICE AND INFORMATION PROCESSING METHOD

TECHNICAL FIELD

The present technique relates to an information processing apparatus that is carried by a user and used for viewing a content, and an information processing method.

BACKGROUND ART

Currently, there is a technique related to an information processing apparatus that detects a direction of a gaze of a user using the information processing apparatus and optimally performs operations.

For example, the technique disclosed in Patent Document 1 is applied to an image display system that reads out a certain number of images from a memory storing a plurality of images converted into image data and outputs the images to a screen. In the image display system, the gaze direction of the user is detected to judge a focus part of the user, and an image including a feature similar to that of the focus part is selected and displayed.

Further, the technique disclosed in Patent Document 2 is applied to an information presenting system that includes a gaze tracking device that judges a gaze position on a display device and presents information to a user. In the information presenting system, by monitoring the gaze position with respect to a plurality of pieces of displayed information, new information is selected and presented based on a correlation with a user's interest level.

Furthermore, Patent Document 3 discloses the technique of detecting a state of a user present in a multimedia information space where the user is capable of viewing a video or listening to music and outputting next media information depending on the detected result.
Patent Document 1: Japanese Patent Application Laid-open No. Hei 09-114846
Patent Document 2: Japanese Patent Application Laid-open No. Hei 10-133810
Patent Document 3: Japanese Patent Application Laid-open No. 2001-216527

SUMMARY OF INVENTION

Problem to be Solved by the Invention

The present technique aims at providing, as an information processing apparatus that provides, to a user viewing a content, information related to that content, an information processing apparatus that excels more in function.

Means for Solving the Problem

According to a first embodiment of the present technique, there is provided an information processing apparatus including: a gaze position detection section that detects a gaze position of a user with respect to a display screen; a position information acquisition section that acquires position information of the user; and a control section that judges, based on the detected gaze position, a scene and an object in the scene that the user focuses in a content displayed on the display screen, and generates search information from the judged object and the acquired position information.

The control section may search a storage device storing contents to be searched, for a recommended content using the search information in a scene unit.

The storage device may be a device capable of performing synchronization processing with a storage device of a recorder via a network.

The control section may control a recorder connected thereto via a network to set a timer recording using the search information.

The control section may: judge a scene that the user focuses in the content displayed on the display screen based on the detected gaze position; segment an image of the judged scene into one or more areas based on a feature amount; judge an area having a highest gaze frequency based on the detected gaze position; and judge the object based on the feature amount of that area.

The control section may judge the object while taking into account priority levels among genres based on viewing locations and viewing times of the user.

The control section may: judge a scene that the user focuses in the content displayed on the display screen based on the detected gaze position; and judge, with respect to the judged scene, the object based on statistical information indicating which object has collected most gazes in the scene in mobile terminals of a plurality of other users.

The control section may: judge a scene that the user focuses in the content displayed on the display screen based on the detected gaze position; and judge, with respect to the judged scene, the object based on a feature spectrum of an area that has collected most gazes in the scene by a plurality of other users.

The control section may judge the object while taking into account metadata related to the judged scene, which is allocated to the scene.

According to another embodiment of the present technique, there is provided an information processing apparatus including a control section that: acquires, from an information processing apparatus of a user, a result of detecting a gaze position of the user with respect to a display screen of the information processing apparatus of the user, position information of the information processing apparatus of the user, and identification information of a content being viewed on the display screen; and judges, based on the acquired gaze position, a scene and an object in the scene that the user focuses in a content specified based on the acquired identification information of a content, generates search information from the judged object and the acquired position information, and transmits the generated search information to the information processing apparatus of the user.

Effect of the Invention

As described above, according to the present technique, an information processing apparatus that excels more in function can be provided as an information processing apparatus that provides, to a user viewing a content, information related to that content.

MODES FOR CARRYING OUT THE INVENTION

Hereinafter, an embodiment of the present technique will be described with reference to the drawings.

First Embodiment

General Outline of Entire Structure of System

A general outline of a structure of an entire system that uses the present technique will be described.

Figure 1:
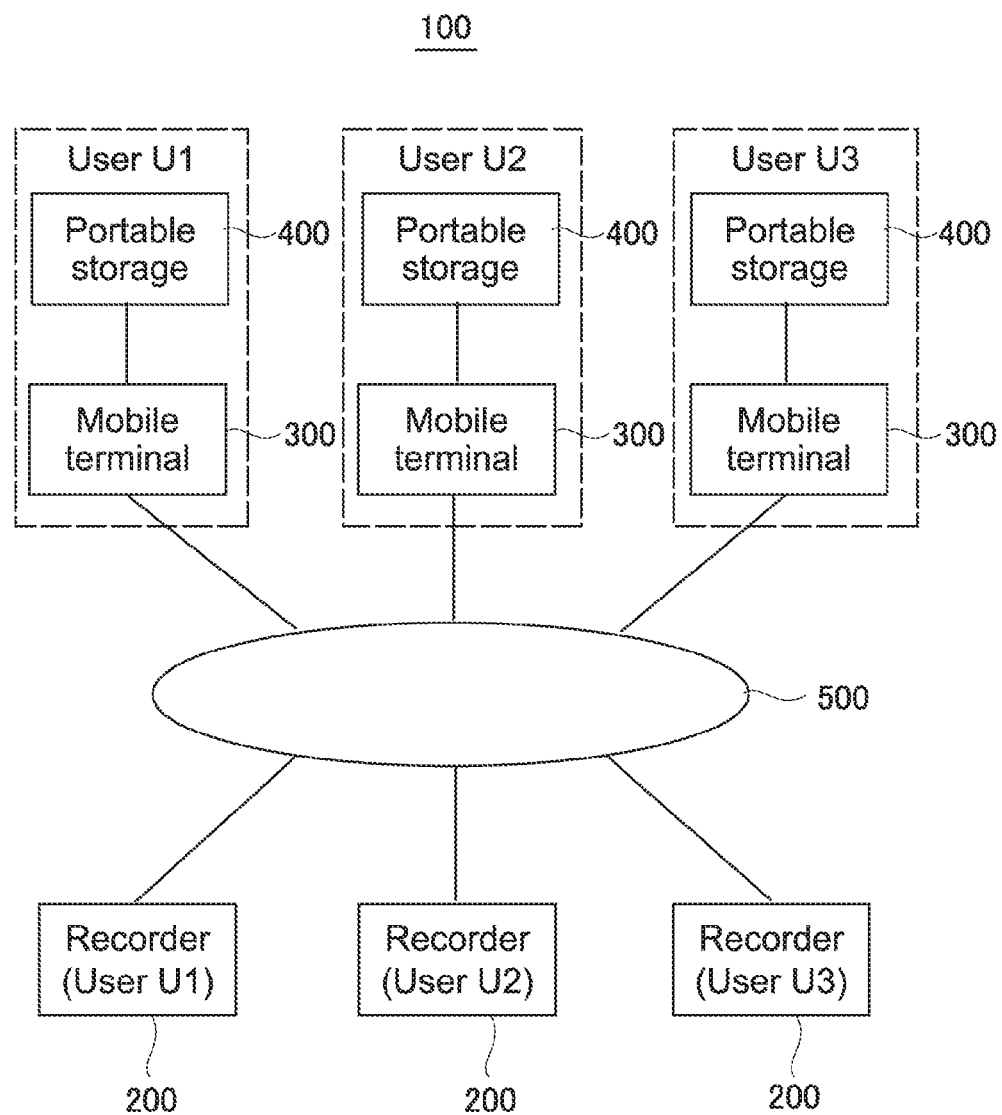
FIG. 1 A diagram showing a general outline of an entire structure of a system 100 according to a first embodiment of the present technique.
Figure 2:
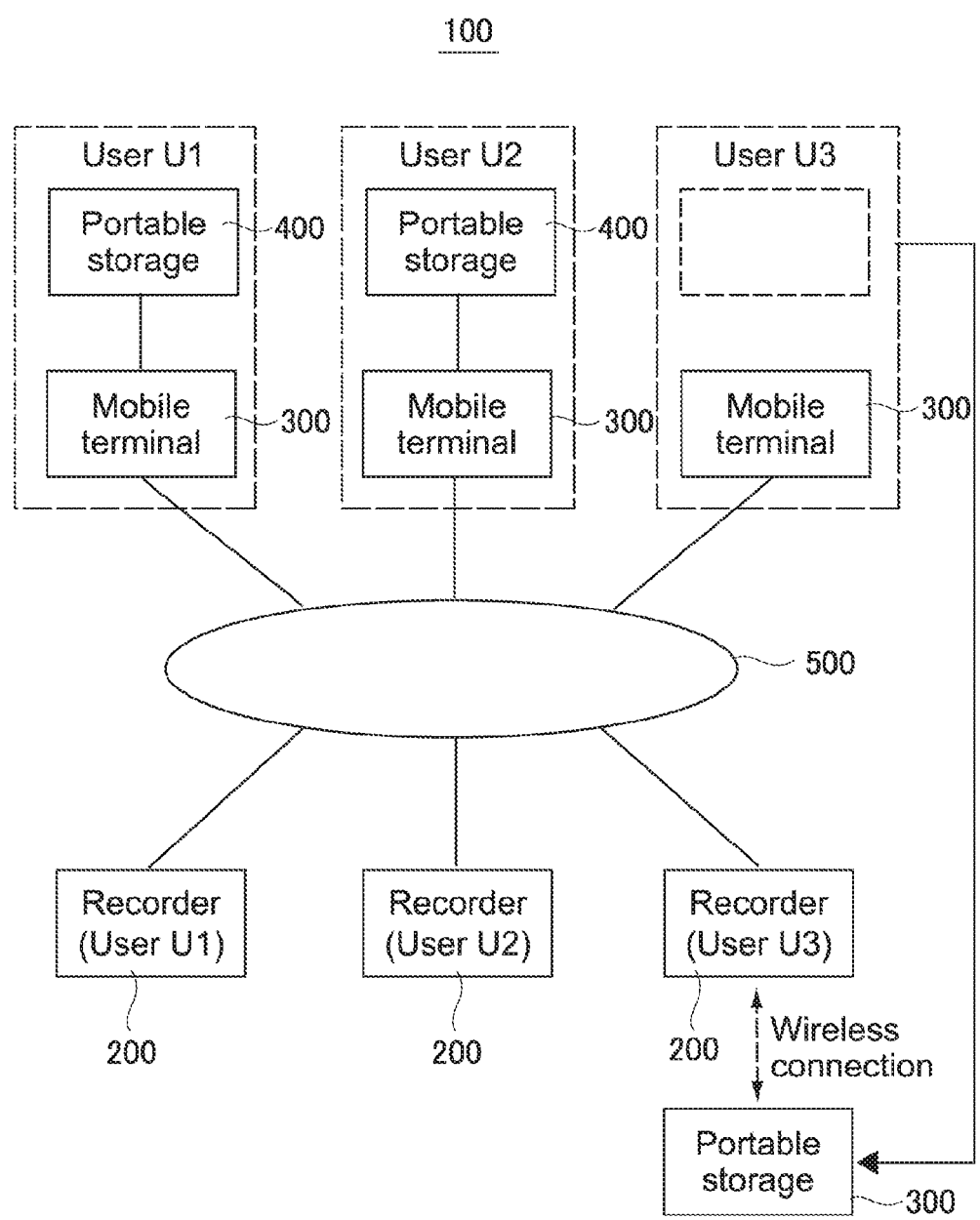
FIG. 2 A diagram showing a general outline of the structure of the system 100.

FIGS. 1 and 2 are each a diagram showing a general outline of the entire structure of the system 100 that uses the present technique. The system 100 includes a plurality of recorders 200, a plurality of mobile terminals 300, and a plurality of portable storages 400. In the figure, three users, that is, users U1, U2, and U3 are assumed to be present. Each user has the recorder 200, the mobile terminal 300, and the portable storage 400, and those apparatuses are mutually connected via a network 500.

A difference between FIGS. 1 and 2 is where the user U3 connects the portable storage 400 to. FIG. 1 shows a state where the three users are viewing contents in the portable storages 400. In contrast, FIG. 2 shows a state where the user U3 connects his/her portable storage 400 to his/her recorder 200, and a content is being copied from the recorder 200 to the portable storage 400.

The recorder 200 receives and records television broadcast radio waves and cable television broadcast signals, or acquires and stores contents of videos and the like from the network 500. Specifically, the recorder 200 is a Blu-ray (registered trademark) recorder or the like.

The portable storage 400 is connected to the recorder 200 or the mobile terminal 300 to be used. The connection may be a wired connection, or wireless communication based on a wireless standard such as Wi-Fi (Wireless Fidelity) may be used.

When the portable storage 400 of the user U3 is connected to the recorder 200 as shown in FIG. 2, contents in the recorder 200 are copied to the portable storage 400, and a synchronization of the contents is performed.

The mobile terminal 300 is a smartphone, a tablet, a mobile PC, or the like. When the mobile terminal 300 is connected to the portable storage 400 as shown in FIG. 1, the user can use application software (application) in the mobile terminal 300 to reproduce and view contents in the portable storage 400.

The application of the mobile terminal 300 searches for content data predicted that the user will be interested in from content data accumulated in the portable storage 400 and recommends viewing to the user.

(General Outline of Recorder 200)

Figure 3:
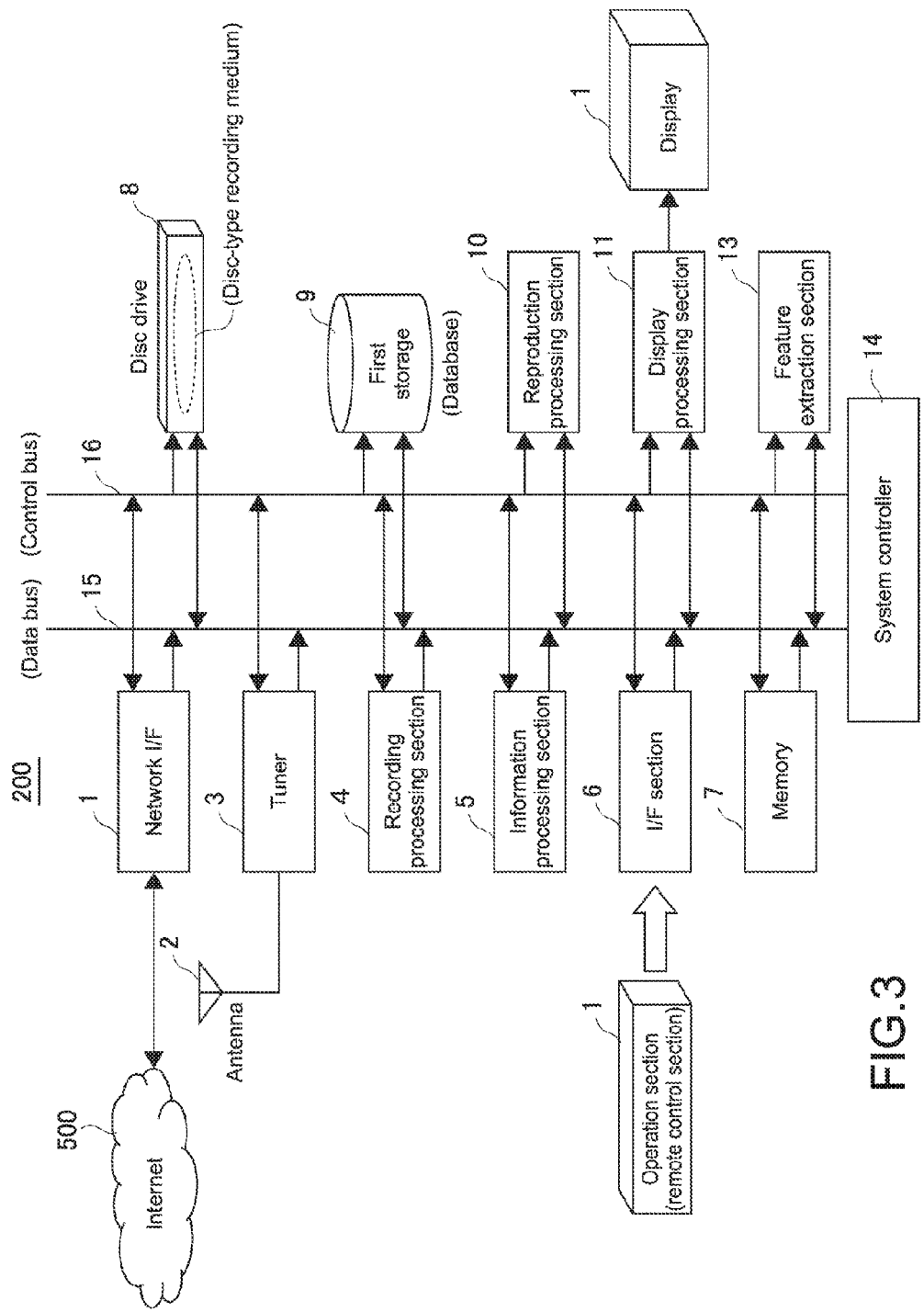
FIG. 3 A block diagram showing an entire structure of a recorder 200.

Next, the entire structure of the recorder 200 will be described. FIG. 3 is a block diagram showing the entire structure of the recorder 200.

The recorder 200 includes a network I/F (Interface) 1, an antenna 2, a tuner 3, a recording processing section 4, an information processing section 5, an I/F section 6, a memory 7, a disc drive 8, a first storage (database) 9, a reproduction processing section 10, a display processing section 11, and a feature extraction section 13. The recorder 200 also includes a system controller 14, a data bus 15, and a control bus 16.

The network I/F 1 exchanges information with the mobile terminal 300, the portable storage 400, and the like via the network 500. The tuner 3 receives broadcast radio waves via the antenna 2. The recording processing section 4 carries out processing of recording content data acquired by the tuner 3 and the network I/F 1 in the first storage 9.

The information processing section 5 searches for a web content on the network 500 such as the Internet based on information that has been received from the mobile terminal 300 and accumulated in the first storage 9.

The I/F section 6 receives signals from an operation section 17 that is a remote controller. The memory 7 is a working area of the recorder 200. The disc drive 8 reads out contents recorded onto a disc-type recording medium 8a or writes contents stored in the first storage 9 onto the disc-type recording medium 8a.

The first storage 9 records content data acquired by the recorder 200 and information related to a timer recording, that has been acquired from the mobile terminal 300. The reproduction processing section 10 carries out processing of reproducing content data recorded in the first storage 9. The display processing section 11 outputs images to a display 12 connected to the recorder 200, such as a television receiver and a monitor.

The feature extraction section 13 extracts features from images, audio, and text information of contents. The extracted features are used for the timer recording and the like. The system controller 14 controls the respective sections of the recorder 200. The data bus 15 is a bus used for the respective sections of the recorder 200 to exchange data such as a content. The control bus 16 is a bus used for the respective sections of the recorder 200 and the system controller to exchange data for control.

(General Outline of Mobile Terminal 300)

Figure 4:
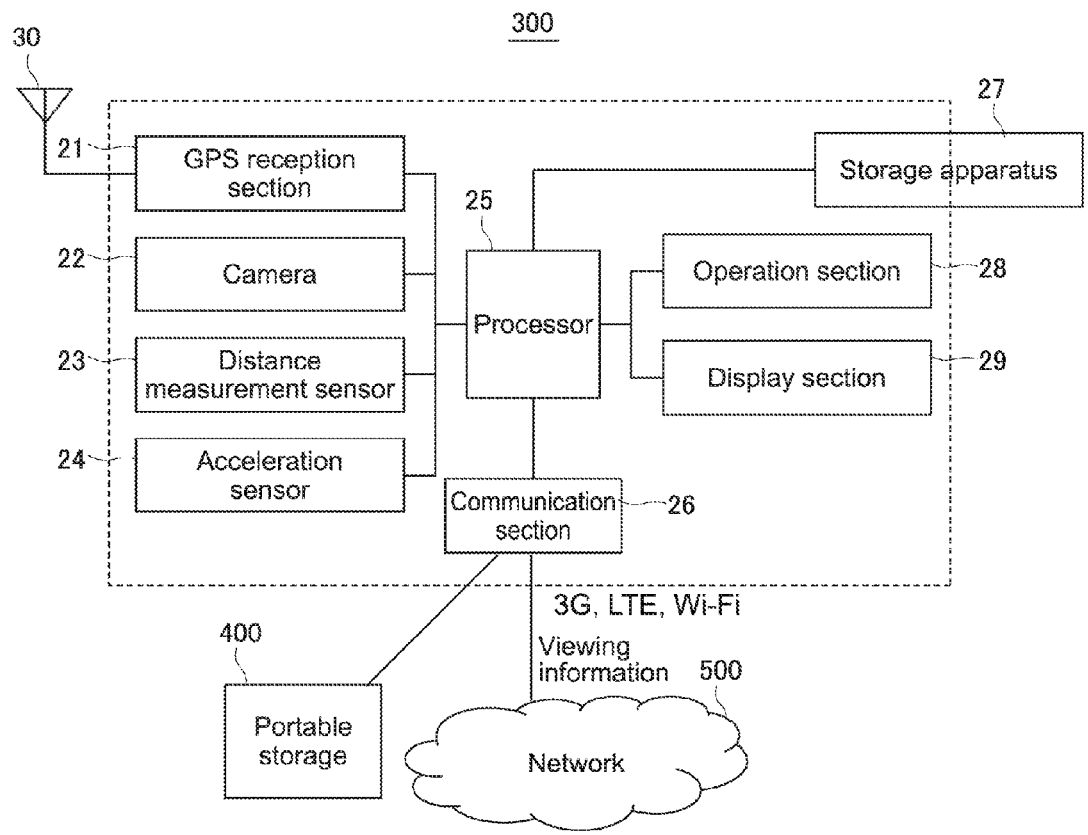
FIG. 4 A block diagram showing an entire structure of a mobile terminal 300.

Next, the entire structure of the mobile terminal 300 (information processing apparatus according to claim 1 in scope of claims) will be described. FIG. 4 is a block diagram showing the entire structure of the mobile terminal 300.

The mobile terminal 300 includes an antenna 30, a GPS (Global Positioning System) reception section 21, a camera 22, a distance measurement sensor 23, an acceleration sensor 24, a processor 25 such as a CPU (Central Processing Unit), a communication section 26, a storage apparatus 27, an operation section 28, and a display section 29.

The GPS reception section 21 receives signals from a GPS satellite via the antenna 30 and detects a current position of the mobile terminal 300. The camera 22 photographs sceneries and the like but is used herein for detecting a direction of a gaze of a user viewing a content using the mobile terminal 300. The distance measurement sensor 23 detects a distance with respect to the user (e.g., face) using the mobile terminal 300.

The acceleration sensor 24 detects movements of the mobile terminal 300 to detect a state in which the mobile terminal 300 is held. For example, when the user views a content using the mobile terminal 300, it is considered that the mobile terminal 300 is placed substantially still.

The processor 25 performs overall control of the mobile terminal 300 or executes application software (application) stored in the storage apparatus 27.

The communication section 26 performs communication via the network 500 or communication with the portable storage 400 based on a communication standard for cellular phones, such as 3G (Third Generation) and LTE (Long Term Evolution) or a wireless communication standard such as Wi-Fi. The operation section 28 accepts inputs for the user to operate the mobile terminal 300.

The display section 29 displays an operation screen of the mobile terminal 300, a reproduction screen used in reproducing contents in the portable storage 400, and the like.

(General Outline of Portable Storage)

Figure 5:
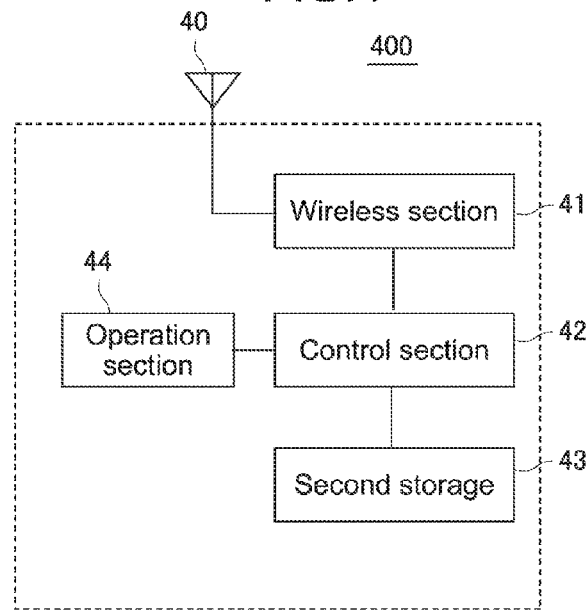
FIG. 5 A block diagram showing a structure of a portable storage 400.

Next, the structure of the portable storage 400 will be described. FIG. 5 is a block diagram showing the structure of the portable storage 400.

The portable storage 400 includes an antenna 40, a wireless section 41, a control section 42, a second storage 43, and an operation section 44.

The wireless section 41 performs communication with the recorder 200 and the mobile terminal 300 via the antenna 40. The control section 42 performs overall control of the portable storage 400, a synchronization of content data with the first storage 9 of the recorder 200, and a transmission of content data to the mobile terminal 300. The control section 42 may also perform encryption processing and decryption processing of content data.

The second storage 43 stores content data copied from the first storage 9 by the synchronization with the recorder 200. It should be noted that the second storage 43 stores recorded contents and unique identifiers for uniquely identifying the contents.

The operation section 44 accepts a user instruction on which of the recorder 200 and the mobile terminal 300 the portable storage 400 is to be connected to. According to the accepted instruction, the control section 42 exchanges data with the recorder 200 or the mobile terminal 300 via the wireless section 41.

This embodiment relates to the technique of searching for information related to a content that the user of the mobile terminal 300 is viewing and providing the information to the user in the system 100 including the structure as described above.

(Operations of Mobile Terminal 300 of this Embodiment)

Figure 6:
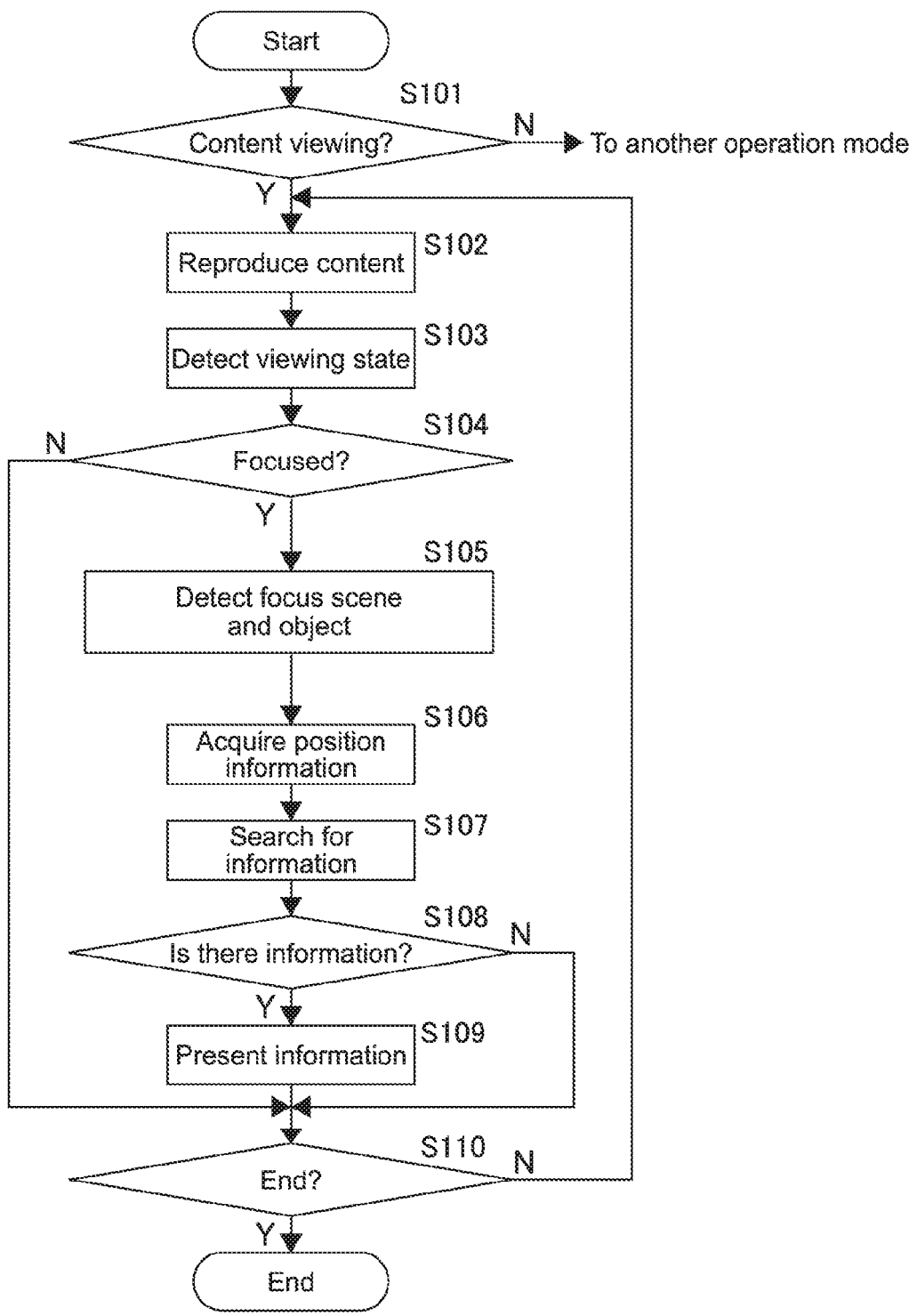
FIG. 6 A flowchart showing operations of the mobile terminal 300 related to the technique.

FIG. 6 is a flowchart showing operations of the mobile terminal 300 related to the technique.

First, the user of the mobile terminal 300 operates the operation section 28 to instruct reproduction of an arbitrary content (e.g., content downloaded from network 500 or content that has been acquired from portable storage 400 and stored in storage apparatus 27) (Step S101). Accordingly, the processor 25 reproduces the content according to the instruction and displays it on a screen of the display section 29 (Step S102).

During the content reproduction, the processor 25 detects a content viewing state of the user (Step S103).

When the processor 25 detects a state where the user is focusing on an object of a certain scene (reproduction time) in the detection of the viewing state (Y in Step S104), the processor 25 judges the scene and the focused object in the scene (Step S105). The object judgment will be described later in detail.

Subsequently, the processor 25 acquires position information of the user (mobile terminal 300) using the GPS reception section 21 (Step S106).

When successfully acquiring the position information of the user, the processor 25 generates content search information from the position information and information on the object judged in Step S105. Here, the content search information is information used for searching for a content stored in the portable storage 400, for example. The processor 25 uses the generated content search information to execute search on a content group stored in the portable storage 400 (Step S108). The search targets metadata related to the contents stored in the portable storage 400.

The content metadata includes, as metadata of each scene, start/end times and a scene content (e.g., data such as shop, product, and CM). The search is executed with respect to the metadata of each scene using a search query.

When succeeding in the search of a scene of a relevant content (Y in Step S108), the processor 25 uses metadata of the content scene to present a list of information related to the relevant content scene on the screen of the display section 29 as a list of scenes of a recommended content (Step S109). When failing in the search for a relevant content (N in Step S108), the processor 25 does not do anything.

When an arbitrary scene is selected by the user on the list of scenes of a recommended content, the processor 25 reads out data of the relevant scene from the portable storage 400 and reproduces it.

Also when the focus state of the user is not detected in Step S104 (N in Step S104), the processor 25 does not do anything.

The processing is ended as the content reproduction is ended (Y in Step S110).

(Method of Judging Scene and Object that User has Focused On)

Next, the method of judging a scene and object that the user has focused on in Steps S104 and S105 will be described.

For example, the gaze state of the user is captured by the camera 22 to measure positions of pupils in an outline of the eyes of the user, a still time (consecutive still time, average still time, etc.), and the like, and the distance measurement sensor 23 detects a distance between the mobile terminal 300 and the face of the user. Accordingly, it is possible to detect a position that the user is looking (gaze position) from the positions of pupils and the distance between the mobile terminal 300 and the face of the user and judge whether the state where the user is looking corresponds to focusing from the still time. Based on those pieces of information, time-series data of the gaze position, that indicates what position and how long the user has been watching an image is obtained for each scene.

Obtaining characteristics of a scene focus of users in advance by learning is beneficial for suppressing lowering of accuracy due to individual differences among users when focusing on a scene. Based on learning data, the state where the user is focusing can be discriminated accurately.

First, the processor 25 detects a scene focused by the user (hereinafter, referred to as "focus scene"). Here, the focus scene is a scene with respect to which there are small movements of the gaze of the user, for example. The processor 25 detects, from the time-series data of the gaze position, a scene whose gaze movement is equal to or smaller than a predetermined threshold value as the focus scene.

Next, the processor 25 judges, from an image of the focus scene, one or more objects that the user has focused on out of one or more objects in the image. This processing is referred to as "focus object judgment processing" herein.

Next, the focus object judgment processing will be described.

(Focus Object Judgment Processing 1)

Figure 7:
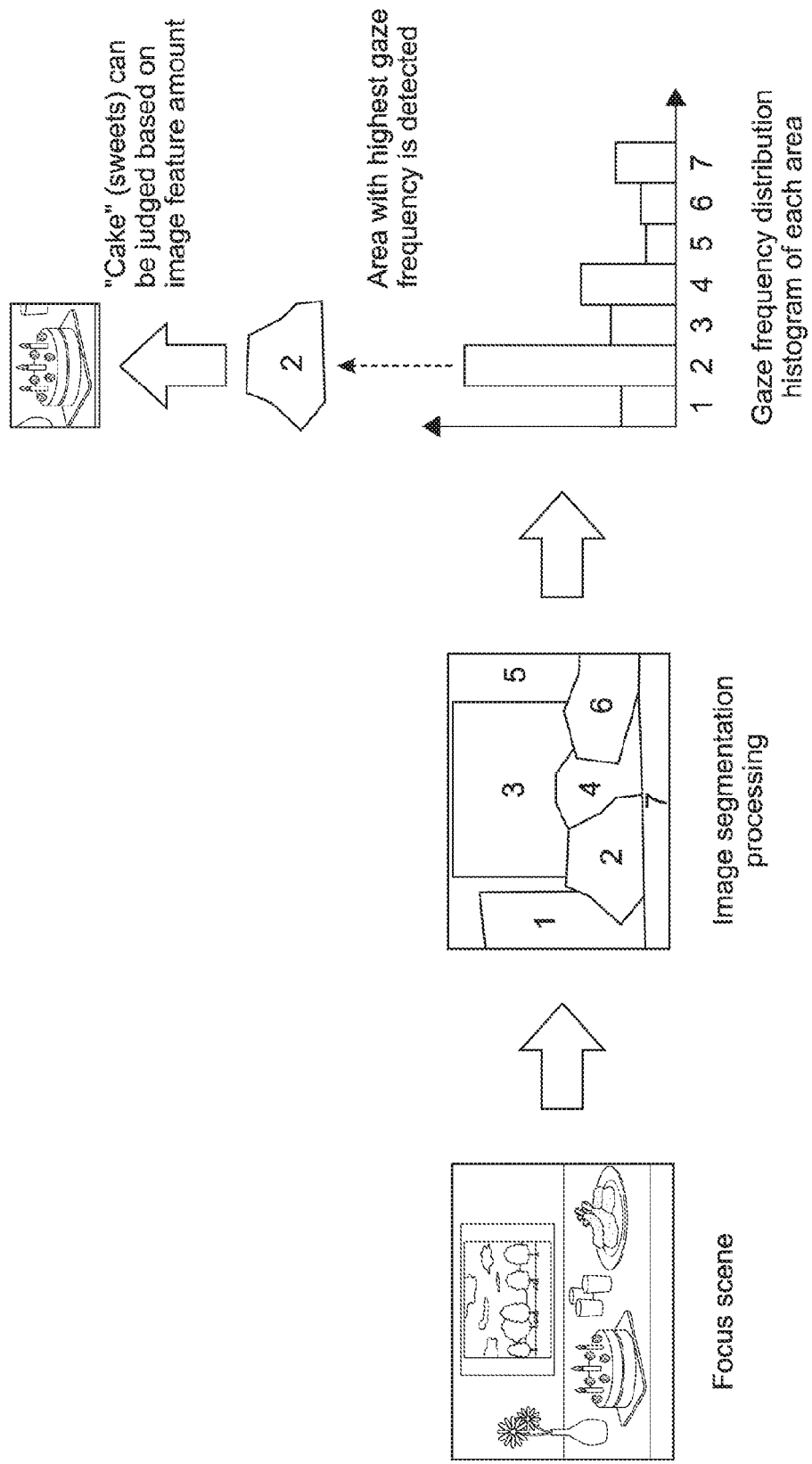
FIG. 7 A diagram for explaining focus object judgment processing 1.

FIG. 7 is a diagram for explaining focus object judgment processing 1.

1. First, regarding an image of a detected focus scene, by analyzing image features such as brightness, color, and texture, processing of segmenting the image into one or more areas having uniform features (image segmentation processing) is carried out.

2. Next, the processor 25 judges, with respect to the one or more areas segmented by the image segmentation processing, an area having a highest gaze frequency based on the time-series data of the gaze position.

3. Then, the processor 25 judges information indicating what kind of an object an image of that area is, based on a feature amount of the image of the area having a highest gaze frequency.

(Focus Object Judgment Processing 2)

Priority levels among genres based on viewing locations and viewing times of the user may be used for the object judgment.

Figure 8:
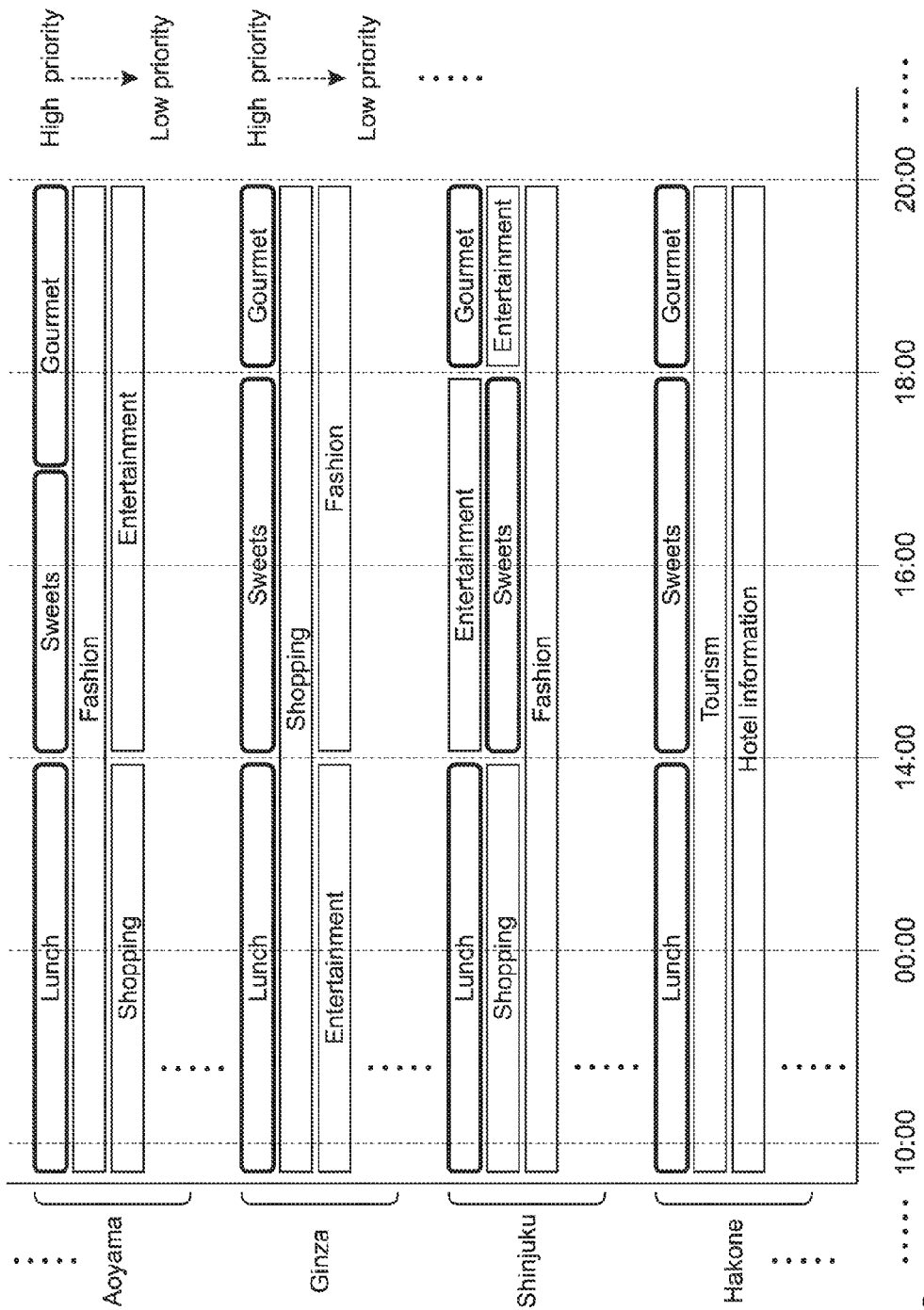
FIG. 8 A diagram showing an example of priority levels among genres based on viewing locations and viewing times of a user.

FIG. 8 is a diagram showing an example of the priority levels among genres based on viewing locations and viewing times of the user. For example, when the viewing location is "Ginza" and the viewing time is "16:00", the priority levels among genres are "sweets", "fashion", and "entertainment" from the top.

Figure 9:
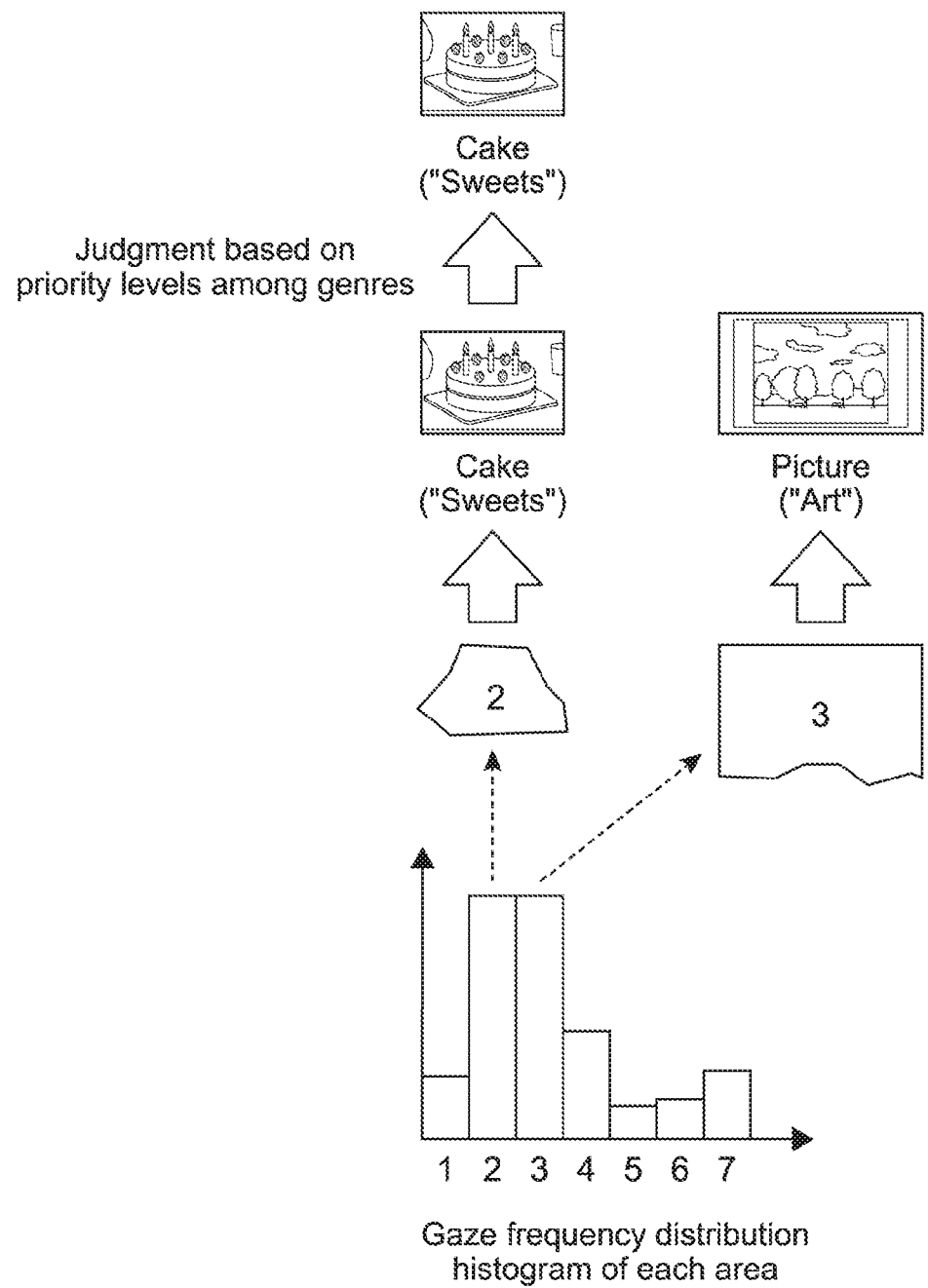
FIG. 9 A diagram for explaining focus object judgment processing 2.

FIG. 9 is a diagram for explaining focus object judgment processing 2.

When a plurality of areas having a highest gaze frequency are judged based on the time-series data of the gaze position, the processor 25 determines which of the objects in the images of those areas is to be the final judgment result based on the priority degrees among genres.

For example, assuming that two objects of "cake" and "picture" are obtained by the focus object judgment processing 1 in FIG. 9, when the viewing location is "Ginza" and the viewing time is "16:00", the priority degree of "sweets" as a genre to which "cake" belongs is highest based on the priority degrees among genres based on the viewing locations and viewing times of the user shown in FIG. 8. As a result, "cake" is obtained as the final judgment result on an object.

It should be noted that the priority degrees among genres based on the viewing locations and viewing times of the user may be prepared according to sex, age, occupation, address, and other types of the user. Further, information on the priority degrees among genres may be updated successively.

(Focus Object Judgment Processing 3)

Figure 10:
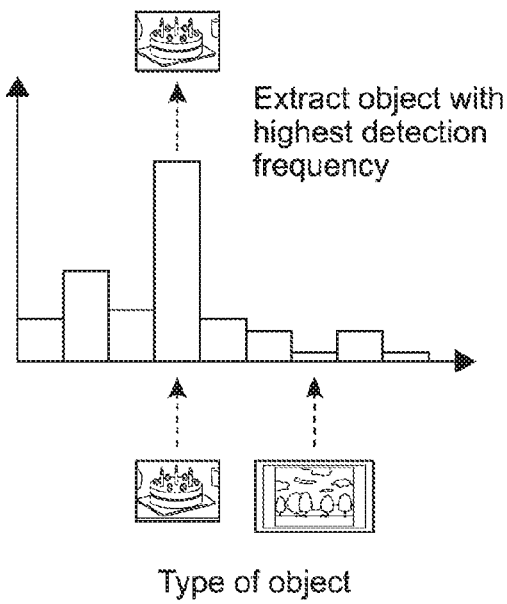
FIG. 10 A diagram for explaining focus object judgment processing 3.

FIG. 10 is a diagram for explaining focus object judgment processing 3.

1. The processor 25 acquires and accumulates statistics information that indicates what object has collected most gazes with respect to a focus scene in the mobile terminals 300 of the plurality of other users.

2. The processor 25 judges, with respect to an image of the focus scene focused by the user of the apparatus itself, information on the object that has collected most gazes from the accumulated statistics information.

It should be noted that in the case of this method, it is desirable for the information on the object obtained in the mobile terminals 300 of the plurality of other users to be obtained by the focus object judgment processing 1 or the like.

When attributes of a plurality of objects are judged by the focus object judgment processing 3, the attributes may eventually be narrowed down to an attribute of one object based on the priority degrees among genres based on the viewing locations and viewing times as in the focus object judgment processing 2.

(Focus Object Judgment Processing 4)

Figure 11:
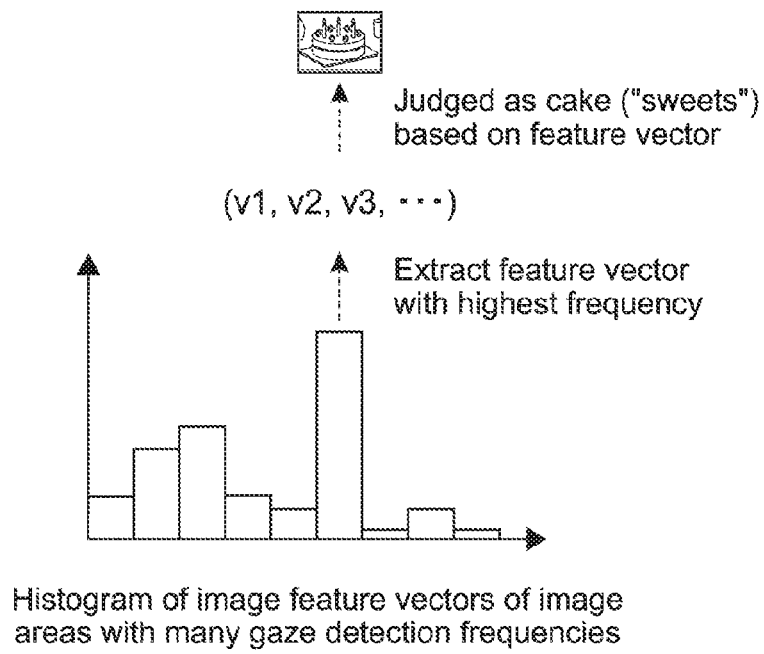
FIG. 11 A diagram for explaining focus object judgment processing 4.

FIG. 11 is a diagram for explaining focus object judgment processing 4.

1. The processor 25 acquires and accumulates feature vectors of an area that has collected most gazes from the plurality of other users with respect to a focus scene.

2. Regarding an image of the detected focus scene, the processor 25 carries out processing of segmenting, by analyzing image features such as brightness, color, and texture, the image into one or more areas having uniform features (image segmentation processing).

3. The processor 25 judges an area having a feature amount closest to the accumulated feature amount among the segmented areas and judges an attribute indicating what object the image of that area is based on the feature amount.

(Focus Object Judgment Processing 5)

Next, a method of referencing post-metadata imparted to a program in the focus object judgment will be described.

Post-metadata is metadata generated by artificially confirming a content of a scene of a program for each scene, for example. The post-metadata includes, for example, information on a program name, a broadcast time, and the like as metadata related to a program and a scene time, a scene content, and the like as metadata related to a scene.

Such post-metadata is stored in a post-metadata server on a network. The post-metadata server manages post-metadata for each program and provides a service of delivering post-metadata via the network.

Next, an operation of judging a focus object while taking into account the post-metadata will be described.

Figure 12:
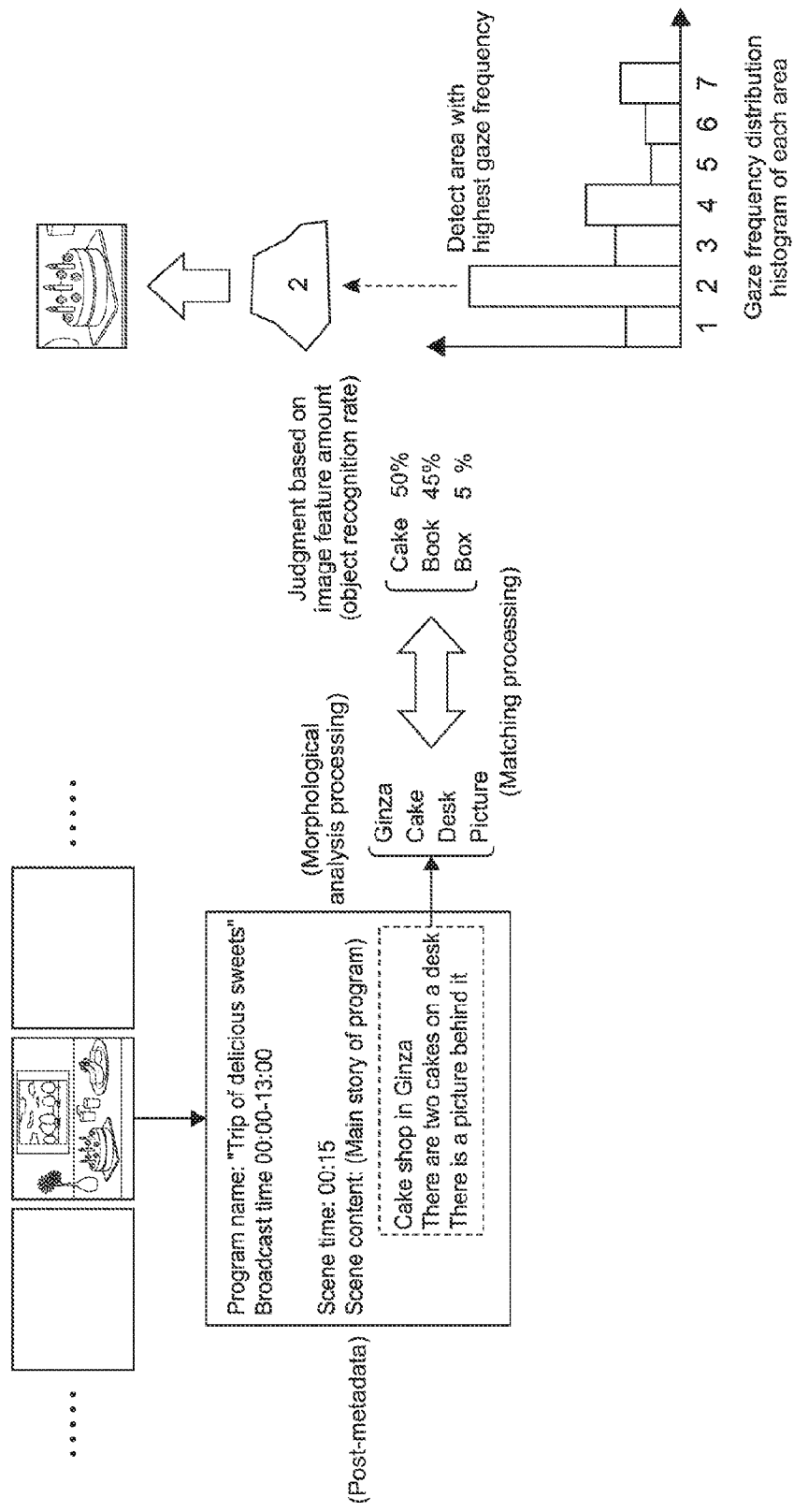
FIG. 12 A diagram for explaining an operation of judging a focus object while taking into account post-metadata of focus object judgment processing 5.

FIG. 12 is a diagram for explaining the operation of judging a focus object while taking into account the post-metadata of the focus object judgment processing 5.

Figure 13:
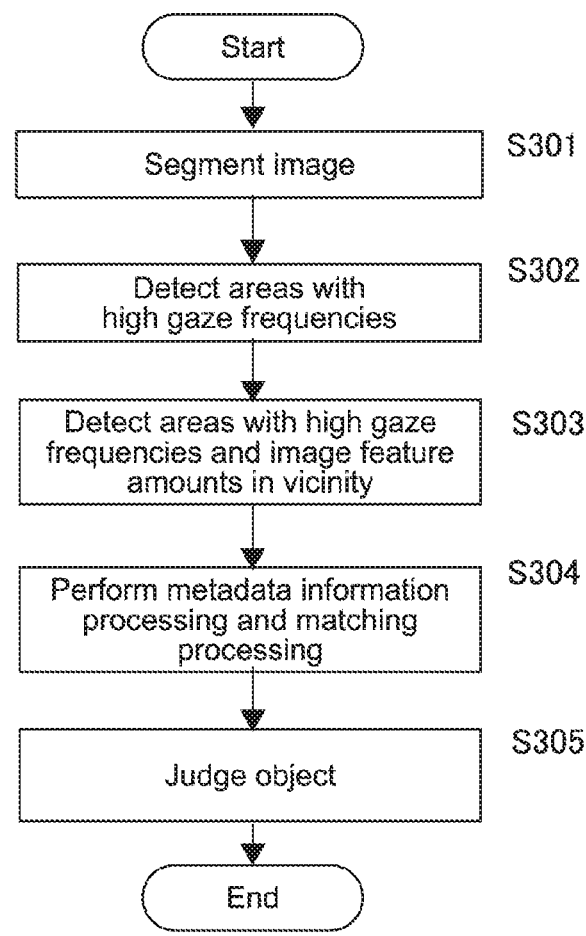
FIG. 13 A flowchart showing operations of the focus object judgment processing 3.

FIG. 13 is a flowchart showing the operations of the focus object judgment processing 3.

1. First, regarding an image of a detected focus scene, by analyzing image features such as brightness, color, and texture, processing of segmenting the image into one or more areas having uniform features (image segmentation processing) is carried out (Step S301).

2. Next, the processor 25 judges, based on time-series data of a gaze position, an area having a highest gaze frequency out of the one or more areas segmented by the image segmentation processing (Step S302).

3. Next, the processor 25 detects n high-order areas having high gaze frequencies and feature amounts of images in the vicinity (Step S303). Here, detecting feature amounts of images in the vicinity is for comprehensively judging, in a case where "cake" is judged based on an image feature amount, for example, assuming that a cake is highly likely placed on a dish, whether the object is "cake" by also detecting an image feature amount of "dish". When judging a certain object as described above, by also judging an object related to that object, a judgment accuracy percentage can be raised. It should be noted that this processing can also be used in other focus object judgment processing.

4. Next, the processor 25 accesses the post-metadata server to acquire post-metadata of the focus scene, references a scene content at a scene time corresponding to the acquired post-metadata, and categorizes it based on words by a morphological analysis and the like (Step S304).

5. Subsequently, the processor 25 judges information indicating what object each image is based on image feature amounts of the n high-order areas, compares a word obtained from the post-metadata with information of the objects in the n high-order areas, and determines information of an object that matches the word as the final object judgment result (Step S305).

It should be noted that when a value of a correct answer recognition rate is obtained in the judgment of an object based on the feature amount, a plurality of objects having a difference in the correct answer recognition rates equal to or smaller than a threshold value in the object judgment result of the n high-order areas are extracted, and an object that matches the word obtained from the post-metadata out of the extracted objects is determined as the final judgment result.

As a result, an object judgment result of higher accuracy can be obtained over a limit of accuracy in the object judgment based on the feature amount.

It should be noted that the operation of judging a focus object while taking into account the post-metadata may involve judging, by the processor 25, whether post-metadata can be acquired, and making a switch such that the operation is executed when post-metadata can be acquired and the focus object judgment processing 1 is executed when post-metadata cannot be acquired.

Moreover, the post-metadata of the focus scene that has been hit in the processing may be added to metadata accumulated in the portable storage 400 and the recorder 200. Accordingly, search accuracy of contents stored in the portable storage 400 can be enhanced.

As described above, according to this embodiment, based on an object of a scene that the user of the mobile terminal 300 is focusing on and position information of the user, information for searching for a content related thereto can be acquired. By using this information, for example, a relevant content can be searched from a content group stored in the portable storage 400 in a scene unit. Accordingly, search ability with respect to contents stored in the portable storage 400 is improved.

Modified Example 1

Figure 14:
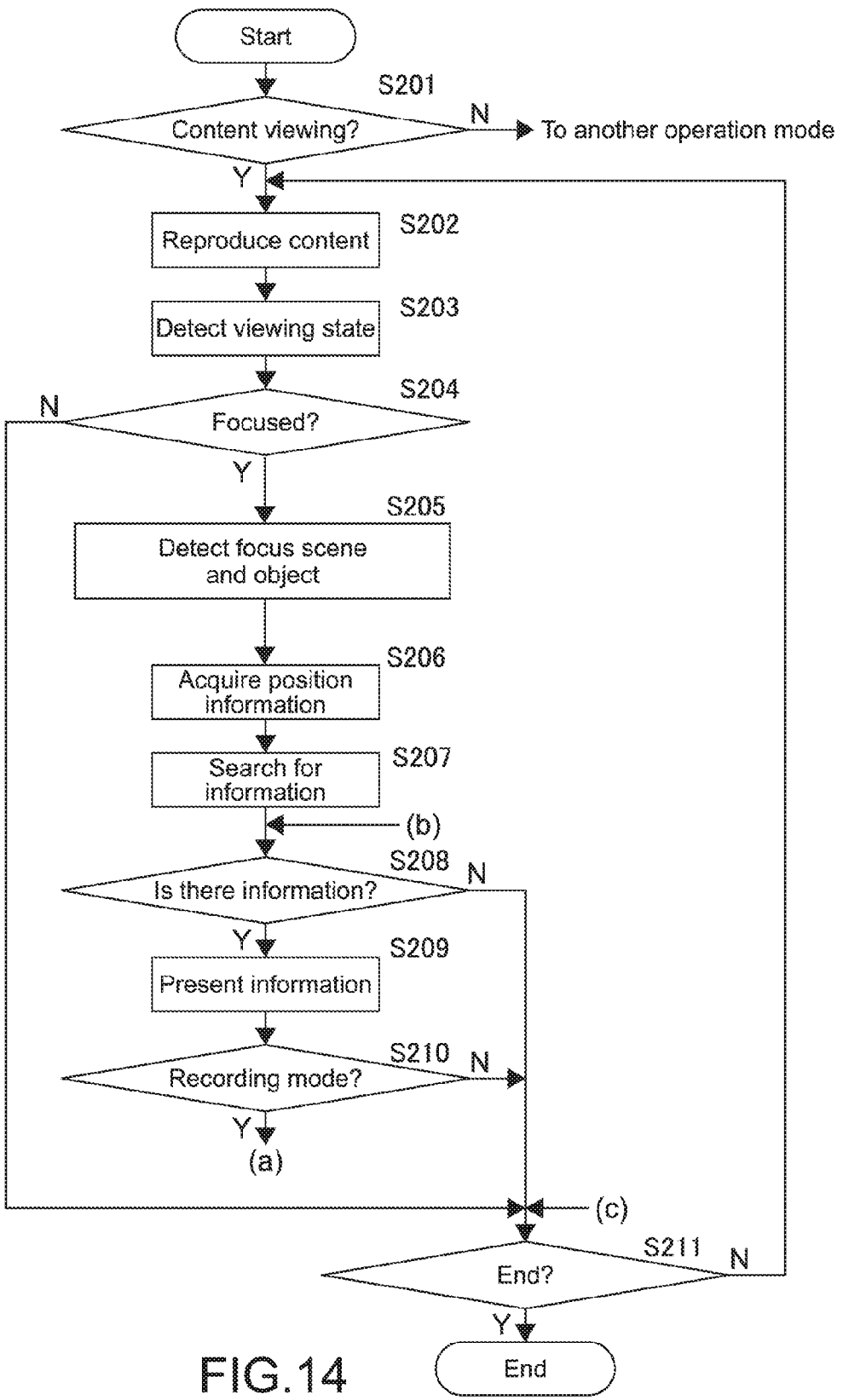
FIG. 14 A flowchart showing a modified example of the operations related to the technique regarding the mobile terminal 300 and the recorder 200.
Figure 15:
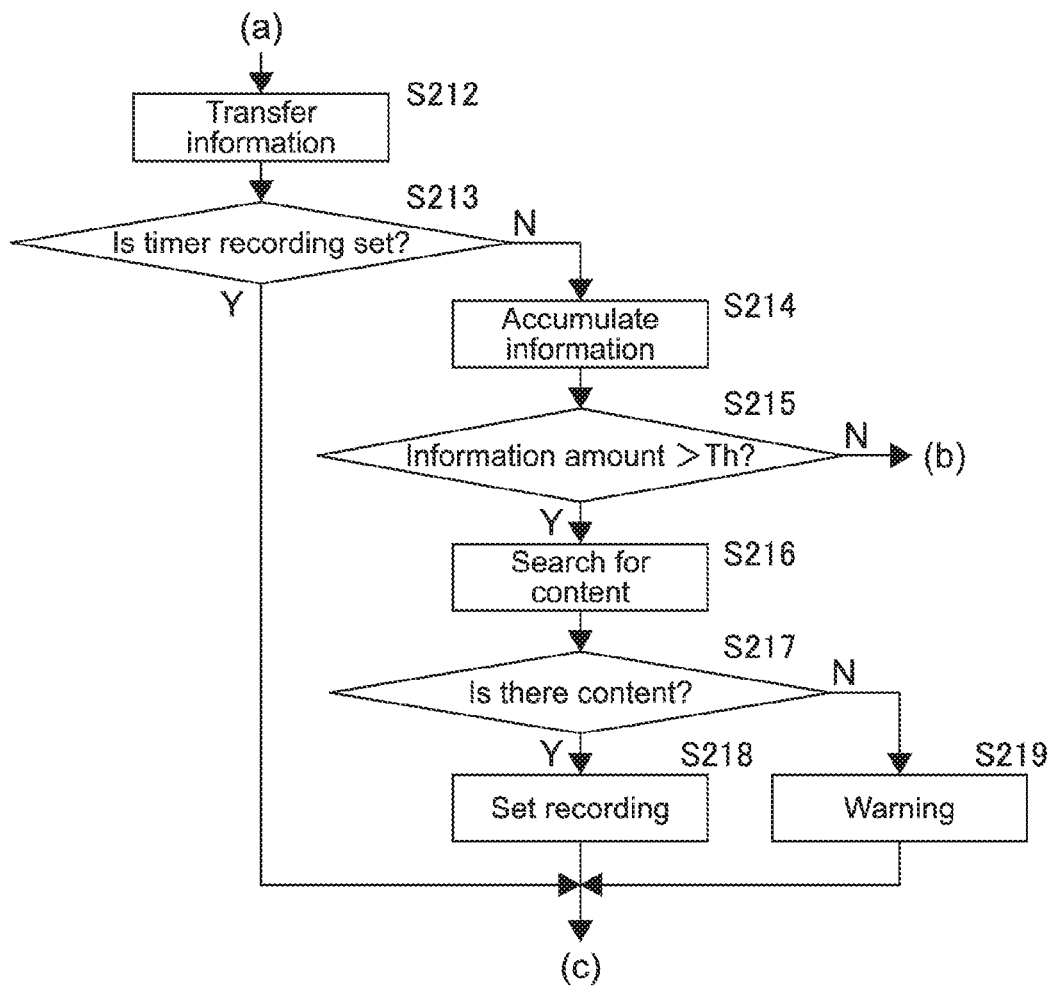
FIG. 15 A flowchart showing a modified example of the operations related to the technique regarding the mobile terminal 300 and the recorder 200.

FIGS. 14 and 15 are each a flowchart showing a modified example of the operations related to the technique regarding the mobile terminal 300 and the recorder 200.

Modified Example 1 uses content search information generated in the mobile terminal 300 in the first embodiment for a timer recording by the recorder 200. It should be noted that the operations from Step S201 to Step S209 are the same as those of Step S101 to Step S109 of the first embodiment. Therefore, descriptions thereof will be omitted.

In Step S210, the processor 25 judges whether a recording mode is set (Step S210). Here, the recording mode is a mode arbitrarily set by the user of the mobile terminal 300. When the recording mode is set (Y in Step S210), the processor 25 transfers content search information generated in Step S207 to the recorder 200 via the network (Step S212).

Upon receiving the content search information, the system controller 14 of the recorder 200 judges whether a timer recording of a program specified based on the information is completed. When the timer recording is completed (Y in Step S213), the system controller 14 of the recorder 200 notifies the mobile terminal 300 of the fact as a response. It should be noted that the case where the timer recording of a program specified based on the content search information is completed is a case where the content search information includes data for specifying a program, such as a program name, broadcast start/end times, and broadcast station information, and the like.

Upon receiving the response, the processor 25 of the mobile terminal 300 shifts to a judgment on ending reproduction of a content (Step S211), and when not ending the reproduction (N in Step S211), returns to a content reproduction state of Step S202.

On the other hand, when unable to specify a program based on the content search information (N in Step S215), the system controller 14 of the recorder 200 accumulates the received content search information (Step S214) and stands by until a sufficient amount of information is accumulated. After that, the processing shifts to Step S208.

When a sufficient amount of content search information is accumulated (Y in Step S215), the system controller 14 of the recorder 200 searches for a relevant content using the accumulated information (Step S216). This search is performed with respect to a server that provides an electronic program guide or a web content publish service, for example.

When a relevant content is found (Y in Step S217), the system controller 14 of the recorder 200 sets a timer recording for that content (Step S218). When a relevant content is not found (N in Step S217), the system controller 14 of the recorder 200 performs predetermined warning processing (Step S219). After that, the processing shifts to Step S211.

Here, examples of the warning processing include processing of displaying a content search failure in the mobile terminal 300 and processing of displaying a list including a content search result and recording state every time metadata is transferred from the mobile terminal 300 in the recorder 200.

As described above, according to this embodiment, using information for searching for a relevant content, that has been generated based on an object of a scene that the user of the mobile terminal 300 is focusing on and position information of the user, a timer recording of the relevant content can be set in the recorder 200.

In the embodiment and modified example described heretofore, at least a part or all of the processing of the mobile terminal 300 can be carried out in one or more servers (correspond to information processing apparatus according to claim 11) arranged on the network 500.

In this case, each server acquires a result of detecting a gaze position of the user, position information of the user, and identification information of a content being viewed on the display screen from the user of the mobile terminal 300. Based on the acquired gaze position, the server judges a scene that the user is focusing on in a content specified by the acquired content identification information and an object in the scene, generates search information from the judged object and the acquired position information, and transmits the information to the mobile terminal 300 of the user.

Accordingly, a processing load of the mobile terminal 300 can be reduced.

Modified Example 2

The focus object judgment processing described above may be executed only when it is judged that the mobile terminal 300 is in the state as follows. Specifically, the acceleration sensor 24 that detects movements of the mobile terminal 300 and the distance measurement sensor 23 that detects a distance from the user (e.g., face) using the mobile terminal 300 and the like are provided in the mobile terminal 300.

The processor 25 executes the focus object judgment processing described above when the user using the mobile terminal 300 is detected to be present in the vicinity based on the output of the distance measurement sensor 23 and the movement of the mobile terminal 300 is detected to be equal to or smaller than a predetermined value based on the output of the acceleration sensor 24. Here, the predetermined value is a value with which a small-movement state at a time the user is holding the mobile terminal 300 and focusing on a content displayed on the display section 29 can be judged, or a value with which a state where the mobile terminal 300 is placed at a stable place can be judged. The threshold values in those cases may be switched as appropriate by the user.

By automatically switching on/off the execution of the focus object judgment processing according to the viewing states of the user as described above, accuracy of the focus object judgment can be raised. Specifically, this is because, when the user is holding the mobile terminal 300 in hand, the movement of the mobile terminal 300 naturally becomes small when the user is focusing on a content being displayed, and also because the state where there is a user near the mobile terminal 300 placed at a stable place is one of the circumstances where the user is focusing on a content being displayed.

It should be noted that although the acceleration sensor 24 is used for detecting movements of the mobile terminal 300, other types of sensors may also be used as long as the movements of the mobile terminal 300 can be detected. Furthermore, although the distance measurement sensor 23 is used for detecting that there is a user using the mobile terminal 300, other types of sensors may also be used as long as the presence of the user using the mobile terminal 300 can be detected.

It should be noted that the present technique may also take the following structures.

(1) An information processing apparatus, including:
a gaze position detection section that detects a gaze position of a user with respect to a display screen;
a position information acquisition section that acquires position information of the user; and
a control section that judges, based on the detected gaze position, a scene and an object in the scene that the user focuses in a content displayed on the display screen, and generates search information from the judged object and the acquired position information.

(2) The information processing apparatus according to (1) above,
in which the control section searches a storage device storing contents to be searched, for a recommended content using the search information in a scene unit.

(3) The information processing apparatus according to (1) or (2) above,
in which the storage device is a device capable of performing synchronization processing with a storage device of a recorder via a network.

(4) The information processing apparatus according to any one of (1) to (3) above,
in which the control section controls a recorder connected thereto via a network to set a timer recording using the search information.

(5) The information processing apparatus according to any one of (1) to (4) above, in which the control section:
judges a scene that the user focuses in the content displayed on the display screen based on the detected gaze position;
segments an image of the judged scene into one or more areas based on a feature amount;
judges an area having a highest gaze frequency based on the detected gaze position; and
judges the object based on the feature amount of that area.

(6) The information processing apparatus according to any one of (1) to (5) above,
in which the control section judges the object while taking into account priority levels among genres based on viewing locations and viewing times of the user.

(7) The information processing apparatus according to any one of (1) to (6) above, in which the control section:
judges a scene that the user focuses in the content displayed on the display screen based on the detected gaze position; and
judges the object in the judged scene based on statistical information indicating which object has collected most gazes in the scene in mobile terminals of a plurality of other users.

(8) The information processing apparatus according to any one of (1) to (7) above, in which the control section:
judges a scene that the user focuses in the content displayed on the display screen based on the detected gaze position; and
judges the object in the judged scene based on a feature spectrum of an area that has collected most gazes in the scene by a plurality of other users.

(9) The information processing apparatus according to any one of (1) to (8) above,
in which the control section judges the object while taking into account metadata related to the judged scene, which is allocated to the scene.

(10) The information processing apparatus according to any one of (1) to (9) above, further including:
a first sensor that detects whether there is a user using the information processing apparatus; and
a second sensor that detects a movement of the information processing apparatus,
in which the control section judges the object when it is detected that there is a user using the information processing apparatus based on an output of the first sensor and the movement of the information processing apparatus takes a value that is equal to or smaller than a predetermined value based on an output of the second sensor.

DESCRIPTION OF SYMBOLS/REFERENCE NUMERALS

9 first storage
14 system controller

21 GPS reception section
22 camera
23 distance measurement sensor
25 processor
26 communication section
27 storage apparatus
29 display section
42 control section
43 second storage
100 system
200 recorder
300 mobile terminal
400 portable storage
500 network

The invention claimed is:

1. An information processing apparatus, comprising:
circuitry configured to:
detect a gaze position of a first user with respect to a display screen;
acquire position information of the first user;
determine, based on the detected gaze position, a scene and an object in the scene that the first user focuses in a content displayed on the display screen;
segment an image of the determined scene into one or more areas based on a feature amount;
determine a first area of the one or more areas having a highest gaze frequency based on the detected gaze position;
determine the object based on the feature amount of the determined first area; and
generate search information from the determined object and the acquired position information.

2. The information processing apparatus according to claim 1, wherein the circuitry is further configured to search a storage device that stores contents to be searched, for a recommended content based on the search information.

3. The information processing apparatus according to claim 2, wherein the storage device is a device that executes a synchronization process with the storage device of a recorder via a network.

4. The information processing apparatus according to claim 1, wherein the circuitry is further configured to control a recorder connected thereto via a network to set a timer recording operation based on the search information.

5. The information processing apparatus according to claim 1, wherein the circuitry is further configured to determine the object while taking into account priority levels among genres based on viewing locations and viewing times of the first user.

6. The information processing apparatus according to claim 1, wherein the circuitry is further configured to:
determine the object in the determined scene based on statistical information indicating which object has collected most gazes in the scene in mobile terminals of a plurality of second users.

7. The information processing apparatus according to claim 1, wherein the circuitry is further configured to:
determine the object in the determined scene based on a feature spectrum of a second area of the one or more areas that has collected most gazes in the scene by a plurality of second users.

8. The information processing apparatus according to claim 1, wherein the circuitry is further configured to determined the object while taking into account metadata related to the determined scene, which is allocated to the scene.

9. The information processing apparatus according to claim 1, further comprising:
a first sensor configured to detect whether there is the first user using the information processing apparatus; and
a second sensor configured to detect a movement of the information processing apparatus,
wherein the circuitry is further configured to determine the object when it is detected that there is the first user using the information processing apparatus based on an output of the first sensor and the movement of the information processing apparatus takes a value that is one of equal to or smaller than a threshold value based on an output of the second sensor.

10. An information processing apparatus, comprising:
circuitry configured to:
acquire, from an information processing apparatus of a user, a result of detection of a gaze position of the user with respect to a display screen of the information processing apparatus of the user, position information of the information processing apparatus of the user, and identification information of a content being viewed on the display screen;
determine, based on the acquired gaze position, a scene and an object in the scene that the user focuses in the content specified based on the acquired identification information of the content;
segment an image of the determined scene into one or more areas based on a feature amount;
determine an area of the one or more areas having a highest gaze frequency based on the detected gaze position;
determine the object based on the feature amount of the determined area;
generate search information from the determined object and the acquired position information; and
transmit the generated search information to the information processing apparatus of the user.

11. An information processing method, comprising:
detecting, by circuitry, a gaze position of a user with respect to a display screen;
acquiring, by the circuitry, position information of the user;
determining, by the circuitry, based on the detected gaze position, a scene and an object in the scene that the user focuses in a content displayed on the display screen;
segmenting, by the circuitry, an image of the scene into one or more areas based on a feature amount;
determining, by the circuitry, an area of the one or more areas having a highest gaze frequency based on the detected gaze position;
determining, by the circuitry, the object based on the feature amount of the determined area; and
generating search information from the determined object and the acquired position information.

12. An information processing method, comprising:
acquiring, by circuitry, from an information processing apparatus of a user, a result of detecting a gaze position of the user with respect to a display screen of the information processing apparatus of the user, position information of the information processing apparatus of the user, and identification information of a content being viewed on the display screen;
determining, by the circuitry, based on the acquired gaze position, a scene and an object in the scene that the user focuses in the content specified based on the acquired identification information of the content;

segmenting, by the circuitry, an image of the scene into one or more areas based on a feature amount;

determining, by the circuitry, an area of the one or more areas having a highest gaze frequency based on the detected gaze position;

determining, by the circuitry, the object based on the feature amount of the determined area;

generating search information from the determined object and the acquired position information; and transmitting the generated search information to the information processing apparatus of the user.

* * * * *